US010170833B1

(12) United States Patent
Hollenbeck et al.

(10) Patent No.: US 10,170,833 B1
(45) Date of Patent: Jan. 1, 2019

(54) ELECTRONICALLY CONTROLLED POLARIZATION AND BEAM STEERING

(71) Applicant: L-3 Communications Corp., New York, NY (US)

(72) Inventors: Michael C. Hollenbeck, CottonWood Heights, UT (US); Jonathan C. Landon, Salt Lake City, UT (US); Rory K. Sorensen, Kaysville, UT (US)

(73) Assignee: L-3 Communications Corp., New York, NY (US)

( * ) Notice: Subject to any disclaimer, the term of this patent is extended or adjusted under 35 U.S.C. 154(b) by 360 days.

(21) Appl. No.: 14/578,101

(22) Filed: Dec. 19, 2014

(51) Int. Cl.
*H01Q 3/34* (2006.01)

(52) U.S. Cl.
CPC .................. *H01Q 3/34* (2013.01)

(58) Field of Classification Search
CPC ........ H04B 7/10; H04B 7/0695; H01Q 21/24; H01Q 9/0428; H01Q 9/0435; H01Q 25/001; H01Q 21/22; H01Q 3/26; H01Q 3/30; H01Q 3/34; H01Q 3/38; H01Q 3/385; H01Q 21/26; H01Q 1/246; H01Q 1/3275; G01S 7/024
USPC ..................................................... 342/372
See application file for complete search history.

(56) References Cited

U.S. PATENT DOCUMENTS 4,062,019 A * 12/1977 Woodward ........... H01Q 21/205
343/797

4,956,643 A * 9/1990 Hahn, III ............. H04B 7/2041
342/368

5,347,287 A 9/1994 Speciale
(Continued)

FOREIGN PATENT DOCUMENTS

CN 102845007 A * 12/2012 ........... H04B 7/0623
EP 2419963 2/2012
(Continued)

OTHER PUBLICATIONS

Ali et al, "A Novel of Reconfigurable Planar Antenna Array (RPAA) With Beam Steering Control," Progress in Electromagnetics Research B, vol. 20 (2010), pp. 125-146.
(Continued)

*Primary Examiner* — Bernarr E Gregory
*Assistant Examiner* — Nuzhat Pervin
(74) *Attorney, Agent, or Firm* — Kirton McConkie; Brian Tucker

(57) ABSTRACT

A transmitter or receiver can include a phased array antenna system in which multiple characteristics of a transmitted or received beam can be controlled electronically. For example, in embodiments that include a transmitter, dual outputs of N signal modifiers can be connected to orthogonal inputs of N dual-orthogonally polarized antenna elements. Each signal modifier can modify the amplitude and phase of a communications signal in two parallel signal paths to produce two signal components each of which is an amplitude-modified/phase-shifted version of the communication signal. Multiple characteristics of the combined beam can be simultaneously controlled by setting the amplitude and/or phase-shift parameter values in the dual signal paths in the signal modifiers to combined values that individually affect each of the multiple characteristics of the combined beam.

15 Claims, 12 Drawing Sheets

(56) References Cited

U.S. PATENT DOCUMENTS

| | | | | |
|---|---|---|---|---|
| 5,349,356 | A * | 9/1994 | Camiade | G01S 7/024 |
| | | | | 342/188 |
| 5,532,706 | A * | 7/1996 | Reinhardt | H01Q 3/0258 |
| | | | | 333/21 A |
| 5,689,272 | A * | 11/1997 | Harrison | H01Q 3/22 |
| | | | | 342/372 |
| 5,966,102 | A * | 10/1999 | Runyon | H01Q 1/246 |
| | | | | 343/797 |
| 6,271,728 | B1 | 8/2001 | Wallace et al. | |
| 7,460,077 | B2 | 12/2008 | Hemmi et al. | |
| 7,844,010 | B2 * | 11/2010 | Ylitalo | H04B 7/0634 |
| | | | | 375/267 |
| 2005/0012665 | A1 * | 1/2005 | Runyon | H01Q 1/246 |
| | | | | 342/372 |
| 2010/0054356 | A1 * | 3/2010 | Keerthi | H04B 7/0617 |
| | | | | 375/267 |
| 2010/0165914 | A1 * | 7/2010 | Cho | H04B 7/0695 |
| | | | | 370/328 |
| 2010/0207819 | A1 * | 8/2010 | Uhl | H01Q 3/2605 |
| | | | | 342/372 |
| 2010/0253585 | A1 * | 10/2010 | Llorens del Rio | H01Q 1/3275 |
| | | | | 343/756 |
| 2010/0261440 | A1 * | 10/2010 | Corman | H01Q 3/26 |
| | | | | 455/91 |
| 2012/0287978 | A1 * | 11/2012 | O'Keeffe | H01Q 21/245 |
| | | | | 375/222 |
| 2013/0088391 | A1 * | 4/2013 | Corman | H04B 7/10 |
| | | | | 342/365 |
| 2014/0341261 | A1 * | 11/2014 | Weiler | H01Q 3/40 |
| | | | | 375/219 |
| 2015/0214633 | A1 * | 7/2015 | Pan | H01Q 1/20 |
| | | | | 343/893 |

FOREIGN PATENT DOCUMENTS

| | | | | |
|---|---|---|---|---|
| JP | 2004080246 | A * | 3/2004 | H01Q 13/08 |
| KR | 20140034895 | A * | 3/2014 | H04B 1/04 |

OTHER PUBLICATIONS

Chia et al., "Electronic Beam-Steering Design for UWB Phased Array," IEEE Transactions on Microwave Theory and Techniques, vol. 54, No. 6 (Jun. 6, 2006), pp. 2431-2438.

Hendrix, Aerospace System Improvements Enabled by Modern Phased Array Radar, Northrop Grumman Electronic Systems (Oct. 2002), 17 pages.

Ingram et al., "Optimizing Satellite Communications With Adaptive and Phase Array Antennas," Georgia Institute of Technology (publication date unknown but prior to Apr. 2, 2014), 7 pages.

Thiel et al., "Electronic beam steering in wire and patch antenna systems using switched parasitic elements," IEEE (1996), pp. 534-537.

* cited by examiner

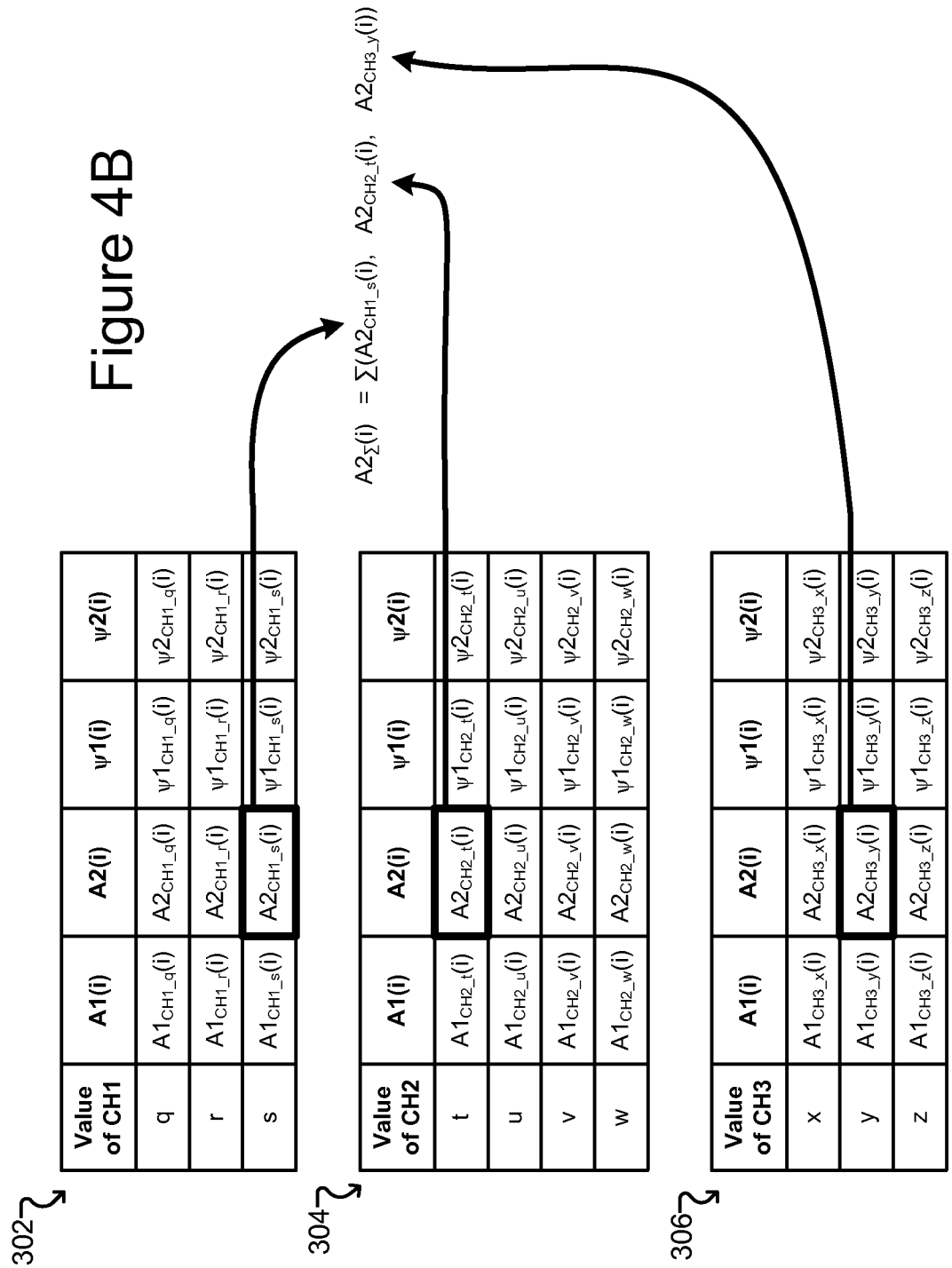

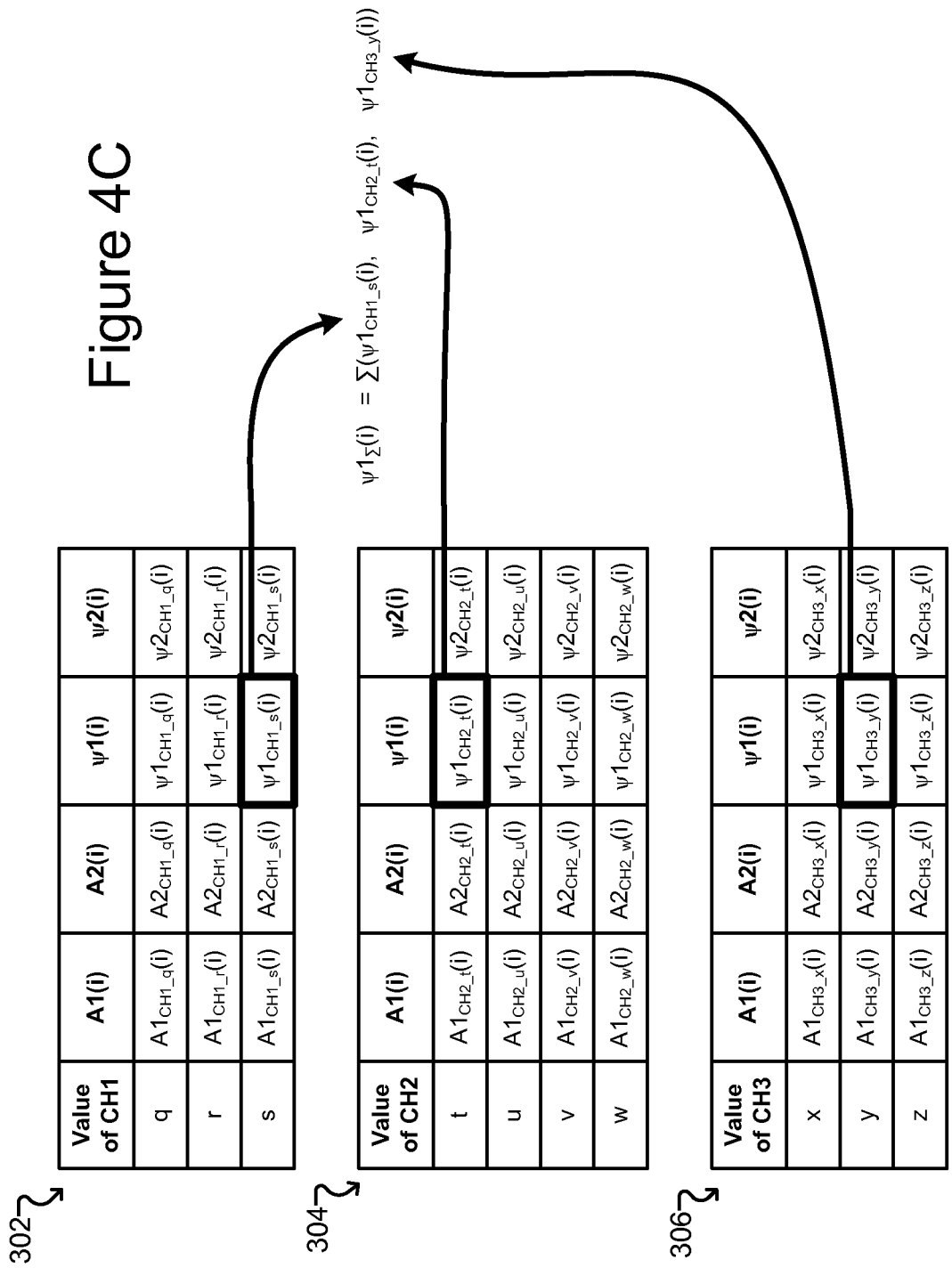

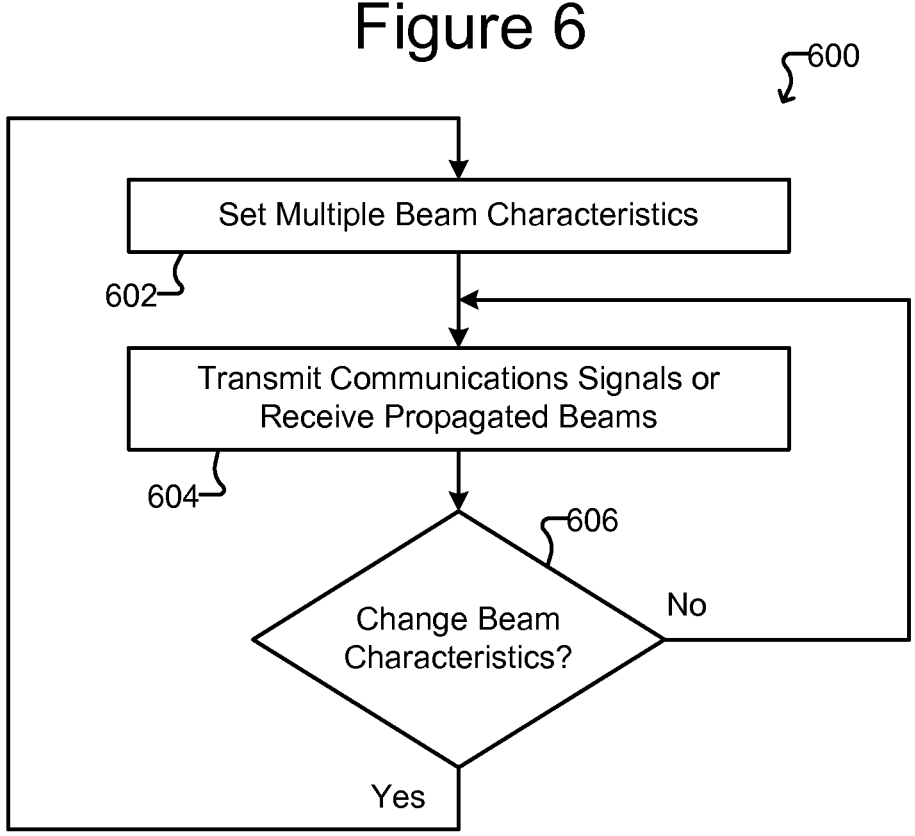

ELECTRONICALLY CONTROLLED POLARIZATION AND BEAM STEERING

BACKGROUND

A phased array antenna system, such as an active electronically scanned array (AESA) antenna system, comprises a plurality of antenna elements whose individual radiation patterns combine to form a desired beam pattern. Some embodiments of the present invention can provide improvements to implementation of steering direction, side-lobe taper, and/or polarization control of phased array antenna systems.

SUMMARY

In some embodiments, an antenna system can include a controller and N dual-orthogonally polarized antenna elements connected to N signal modifiers. An $i^{th}$ one of the N signal modifiers can include a first processing path and a second processing path. The first processing path can be connected to a first input or output of an $i^{th}$ one of the antenna elements, and the first processing path can include a first amplitude controller and a first phase shifter. The second processing path can be connected to a second input or output of the $i^{th}$ one of the antenna elements, and the second processing path can include a second amplitude controller and a second phase shifter. The first input and the second input can be dual-orthogonally polarized inputs or outputs. The controller can be configured to set the first phase shifter with a first combined phase-shift parameter that corresponds to both a first characteristic and a second characteristic of a beam to be formed by radiation patterns radiated by the N antenna elements or a beam received at the N antenna elements.

Some embodiments of the invention can be directed to a process of operating an antenna system comprising N signal modifiers each of which can comprise a first processing path and a second processing path. The antenna system can also comprise N dual-orthogonally polarized antenna elements each of which can be connected to a first processing path and a second processing path of one of the signal modifiers. The process can include setting a first phase shifter in the first processing path of an $i^{th}$ one of the N signal modifiers with a first combined phase-shift parameter that corresponds to both a first characteristic and a second characteristic of a beam formed by radiation patterns from the N antenna elements or a beam to be received at the N antenna elements.

BRIEF DESCRIPTION OF THE DRAWINGS

FIGS. 4A-4D illustrate an example in which the memory structures of FIG. 3 are utilized to determine combined values of amplitude and phase-shift parameters for the signal modifiers of FIG. 1 to set the transmitter to impart multiple desired characteristics to the combined beam according to some embodiments of the invention.

FIG. 6 shows an example operation of the transmitter of FIG. 1 or receiver of FIG. 5 according to some embodiments of the invention.

DETAILED DESCRIPTION OF EXEMPLARY EMBODIMENTS

Figure 1:
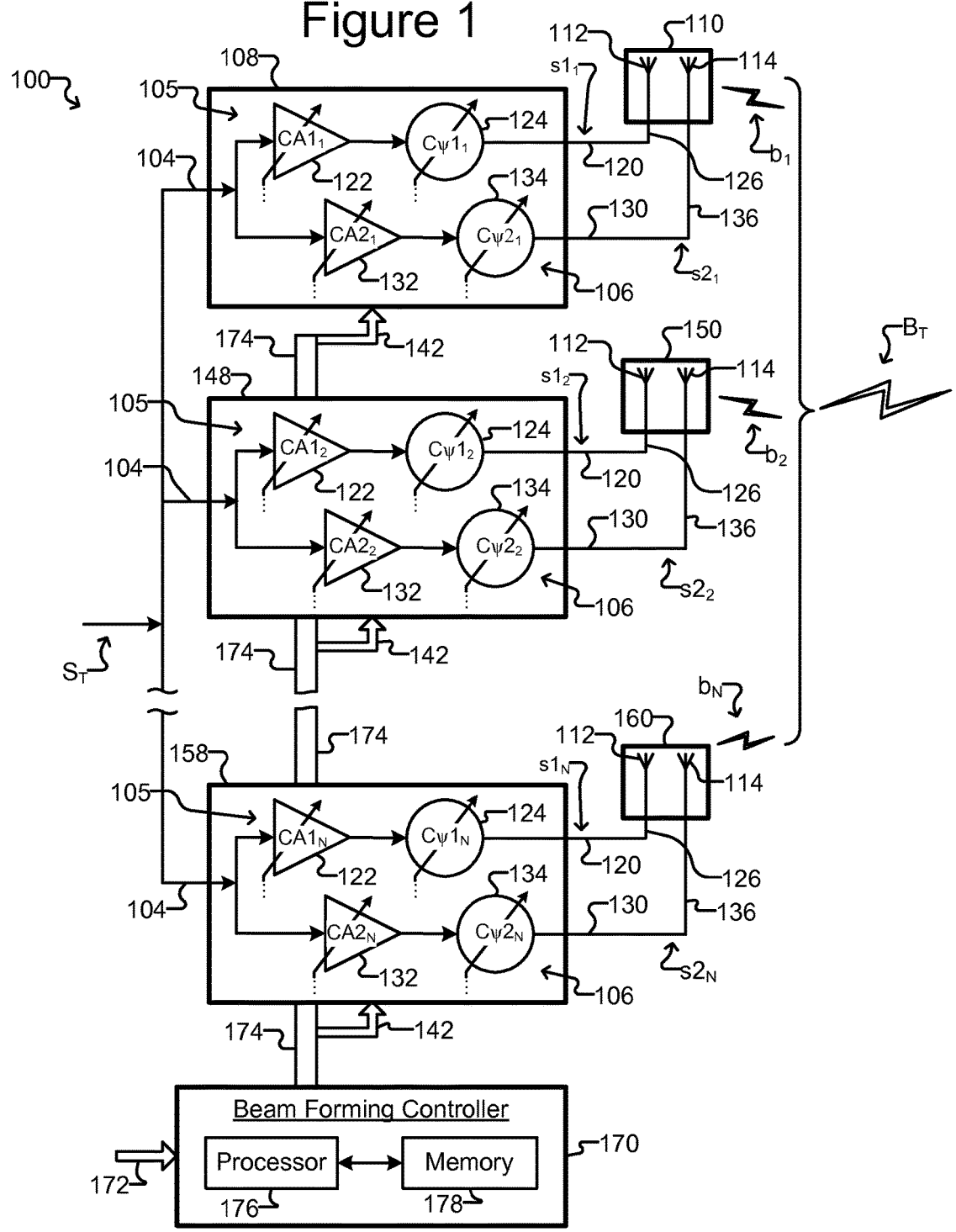
FIG. 1 illustrates an example of a transmitter according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

Polarization herein can be circular, which can be defined in terms of two orthogonal linear components with a substantially ninety degree (90°) phase difference to form either a right-hand circularly polarized (RHCP) or a left-hand circularly polarized (LHCP) signal. Polarization can also be linear, which can be defined in terms of a horizontal component and a vertical component with a substantially zero degree (0°) or one-hundred and eighty degree (180°) phase difference. Furthermore, linear polarization can be rotated or steered either by varying the magnitude of two orthogonal linear components while maintaining substantially zero degree (0°) or one-hundred and eighty degree (180°) phase difference, or by varying the phase of right-hand and left-hand circularly polarized components while maintaining substantially equal magnitude.

Some embodiments of the present invention can be directed to a phased array antenna system in which multiple characteristics of a transmitted or received beam can be controlled electronically. For example, in embodiments that include a transmitter, dual outputs of N signal modifiers can be connected to orthogonal inputs of N dual-orthogonally polarized antenna elements. Each signal modifier can modify the amplitude and phase of a communications signal in two parallel signal paths to produce two signal components, each of which is an amplitude-modified/phase-shifted version of the communications signal. The two signal components from each signal modifier can be provided to the two orthogonal inputs of a corresponding dual-orthogonally polarized antenna element, which can radiate the two signal components. The element radiation patterns radiated from the N antenna elements can combine to produce a combined transmission beam. Multiple characteristics of the combined beam can be simultaneously controlled by setting the amplitude and/or phase-shift parameter values in the dual signal paths in the signal modifiers to combined values that are a combination of values that individually affect each of the multiple characteristics of the combined beam. An embodiment that includes a receiver can comprise N dual-orthogonally polarized antenna elements each comprising dual-orthogonally polarized outputs to dual inputs of one of N signal modifiers. The N antenna elements and N signal modifiers of a receiver embodiment can operate in reverse but otherwise be similar to the N antenna elements and signal modifiers of a transmitter embodiment as discussed above.

FIG. 1 illustrates an example of a transmitter 100, which can be part of a transmit-only radio frequency (RF) communications system or an RF transceiver. As shown, the system 100 can comprise N signal modifiers 108, 148, 158; N dual-orthogonally polarized antenna elements 110, 150, 160; and a beam-forming controller 170. N can be an integer greater than or equal to two. For example, N can be two, three, four, five, ten, twenty, fifty, or greater. N can alternatively be an integer between any of the foregoing examples.

The transmitter 100 can comprise a phased array antenna system such as an active electrically scanned array (AESA) system. The transmitter 100 can receive a communications signal $S_T$ to be transmitted. A first processing path 105 and a second processing path 106 in each signal modifier 108, 148, 158 can modify the amplitude and phase of the communications signal $S_T$ to produce first and second signal components s1, s2, which can be output 120, 130 to first and second orthogonal inputs 126, 136 of a corresponding one of the dual-orthogonally polarized antenna elements 110, 150, 160. Each antenna element 110, 150, 160 can radiate the signal components s1, s2 that arrive at its inputs 126, 136. The beam-forming controller 170 can set and later change the values of the amplitude parameters and phase-shift parameters in the signal modifier 108, 148, 158 and thereby set and change multiple characteristics of the combined transmitted beam $B_T$ formed by the radiation patterns b(i) from each antenna element 110, 150, 160.

The communications signal $S_T$, and thus each of the signal components s1, s2 provided by the signal modifiers 108, 148, 158 at the outputs 120, 130 can comprise a modulated carrier signal, which can be a radio frequency (RF) signal and thus in an RF range of frequencies. For example, the communications signal $S_T$ can be in frequency ranges between three kilohertz (kHz) and three hundred gigahertz (GHz).

The signal modifiers 108, 148, 158, antenna elements 110, 150, 160, and beam-forming controller 170 are now discussed in more detail.

Figure 2:
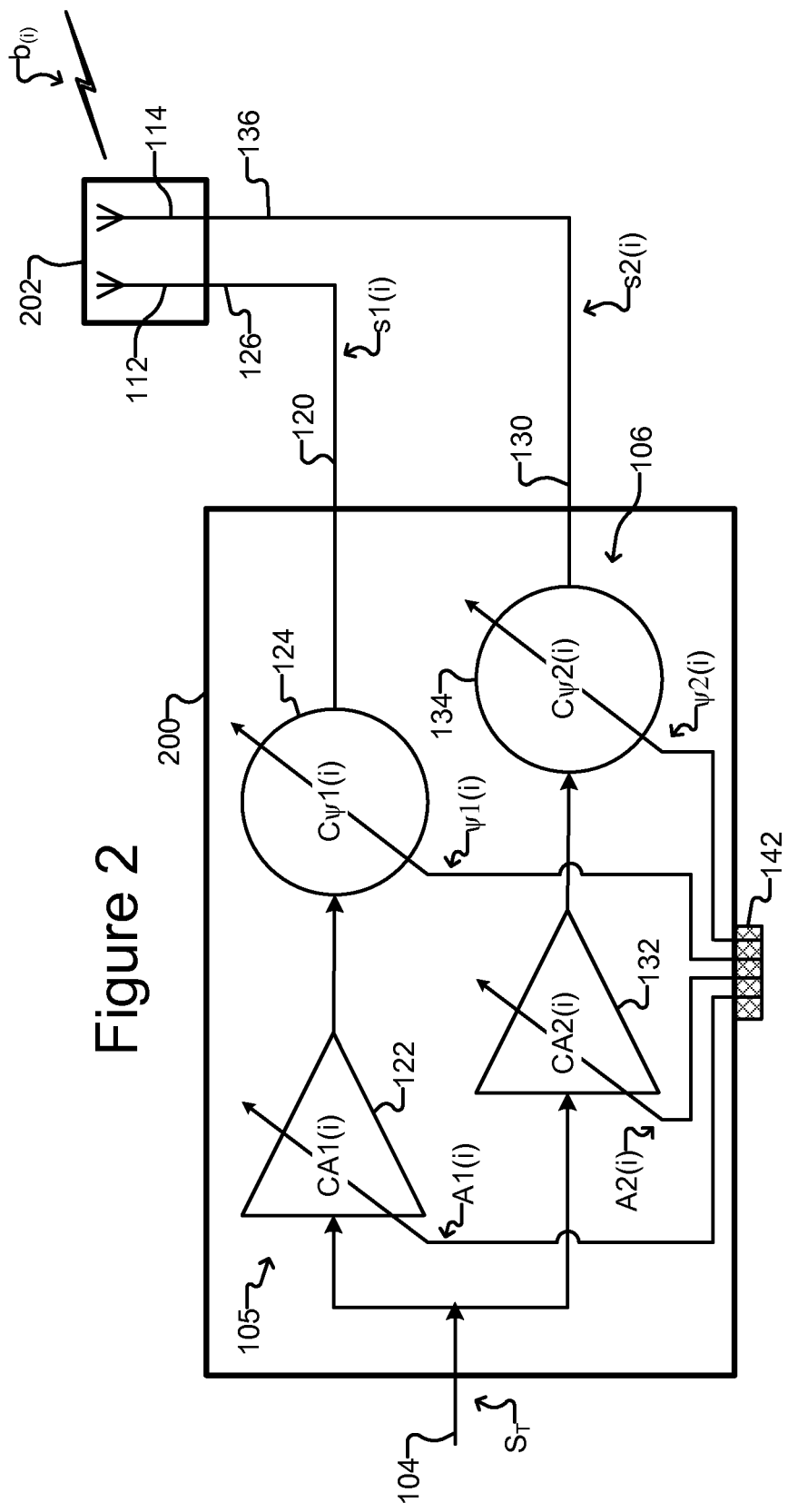
FIG. 2 shows an example configuration of the signal modifiers of FIG. 1 according to some embodiments of the invention.

The signal modifier 200 of FIG. 2 is an example configuration of the $i^{th}$ signal modifier 108, 148, 158 in FIG. 1. Any or all of the signal modifiers 108, 148, 158 in FIG. 1 can be configured like the signal modifier 200, where i equals one to N.

As shown in FIG. 2, a signal modifier 200 can comprise a signal input 104, parameter inputs 142, a first signal output 120, and a second signal output 130. The signal modifier 200 can also include a first processing path 105 from the input 104 to the first output 120 and a second processing path 106 from the input 104 to the second output 130. The first processing path 105 can comprise a first path amplitude controller CA1(i) 122 and a first path phase controller Cψ1(i) 124. The communications signal $S_T$ can be provided (e.g., through a splitter (not shown) that splits the communications signal $S_T$ into two half power signals) from the input 104 to the first path 105 and the second path 106.

In the first path 105, the first path amplitude controller CA1(i) 122 can control the amplitude of the signal $S_T$ in the first path 105 in accordance with the current value of a first path amplitude parameter A1(i), and the first path phase controller Cψ1(i) 124 can shift the phase of the signal $S_T$ in accordance with the current value of a first path phase-shift parameter ψ1(i) to produce the first signal component s1(i) at the first output 120. In the second path 106, the second path amplitude controller CA2(i) 132 can control the amplitude of the signal $S_T$ in the second path 106 in accordance with the current value of a second path amplitude parameter A2(i), and the second path phase controller Cψ2(i) 134 can shift the phase of the signal $S_T$ in the second path 106 in accordance with the current value of a second path phase-shift parameter ψ2(i) to produce the second signal component s2(i) at the second output 130.

The first path amplitude controller CA1(i) 122 can comprise one or more variable gain amplifiers (VGAs) and/or variable attenuators for changing the amplitude of the communications signal $S_T$ in the first path 105 in accordance with the currently set value of the first path amplitude parameter A1(i). The second path amplitude controller CA2(i) 132 can similarly comprise one or more VGAs and/or variable attenuators for changing the amplitude of the communications signal $S_T$ in the second path 106 in accordance with the currently set value of the second path amplitude parameter A2(i). The first path phase controller Cψ1(i) 124 can comprise one or more variable phase shifters for shifting the phase of the communications signal $S_T$ in the first path 105 in accordance with the currently set value of the first path phase-shift parameter ψ1(i), and the second path phase controller Cψ2(i) 134 can likewise comprise one or more variable phase shifters for shifting the phase of the communications signal $S_T$ in the second path 106 in accordance with the currently set value of the second path phase-shift parameter ψ2(i).

The particular values of the first path amplitude parameter A1(i), the first path phase-shift parameter ψ1(i), the second path amplitude parameter A2(i), and the second path phase-shift parameter ψ2(i) can be set and changed via the control input 142 to the signal modifier 200. As noted, the beam-forming controller 170 can set or change the values of the amplitude and phase-shift parameters A1(i), ψ1(i), A2(i), ψ2(i) in any one or more of the signal modifiers 108, 148, 158 by providing new values through its output 174 to the parameters input 142 of one or more of the signal modifiers 108, 148, 158.

FIG. 2 also illustrates an example configuration 202 of the $i^{th}$ antenna element 110, 150, 160 in FIG. 1. Any or all of the antenna elements 110, 150, 160 can be configured like the antenna element 202.

The antenna element 202 of FIG. 2 can be a dual-orthogonally polarized antenna element comprising a first signal component input 126 and a second signal component input 136. As a dual-orthogonally polarized antenna element, the antenna element 202 can be modeled as having a first antenna component 112 and a second antenna component 114. The second antenna component 114 can radiate substantially orthogonal to the first antenna component 112. For example, if the antenna elements are linearly polarized, one of the first or the second antenna components 112, 114 can be a vertical component and the other of the first or second antenna components 112, 114 can be a horizontal component. The "polarization angle" of a linear polarized beam can be the angle of the resolved values of the vertical component and the horizontal component. As another example, if the antenna elements are circularly polarized, one of the first or the second antenna components 112, 114 can be a right-hand circularly polarized component and the other of the first or second antenna components 112, 114 can be a left-hand circularly polarized component. Because the inputs 126, 136 feed orthogonally polarized antenna components 112, 114, the inputs 126, 136 are referred to herein as orthogonally polarized inputs regardless of whether the inputs 126, 136 are physically orthogonal to each other.

As shown in FIG. 2, the first input 126 of the antenna element 202 can be connected to the first output 120 of the signal modifier 200, and the second input 136 can similarly be connected to the second output 130 of the signal modifier 200. The antenna element 202 can thus receive at its first and second orthogonally polarized inputs 126, 136 the first and second signal components s1(i), s2(i) provided by the signal modifier 200 at its outputs 120, 130.

The beam-forming controller 170 can comprise a processor 176 and a digital memory 178. The processor 176 can be, for example, a digital processor, computer, or the like, and the digital memory 178 can be a non-transitory digital memory for storing data and machine executable instructions (e.g., software, firmware, microcode, or the like) as non-transitory data or signals. The controller 170 can be configured to operate in accordance with such machine executable instructions stored in the memory 178. Alternatively or in addition, the controller 170 can comprise hard-wired digital circuitry and/or analog circuitry. The controller 170 can be configured to perform all or part of any process (e.g., process 600 of FIG. 6) or any step of a process, function, act, or the like discussed herein.

Regardless of how the controller 170 is configured (e.g., as a processor operating in accordance with machine executable instructions, as a hard wired device, or a combination of the foregoing), the controller 170 is a "circuit" as that term is used herein. The processor 176 and/or the memory 178 storing machine executable instructions (as described above) as non-transitory data and/or signals can also be deemed "circuits." Moreover, any element identified or described herein as a "circuit" can be configured in whole or in part as a processor (e.g., like 176) configured to operate in accordance with machine executable instructions stored in a digital memory (e.g., like 178), a hard wired device, or a combination of the foregoing.

The controller 170 can be a stand-alone device as illustrated in FIG. 1. Alternatively, the controller 170 can be a distributed device. For example, all or part of the controller 170 can be part of any one or more of the signal modifiers 108, 148, 158 of FIG. 1.

As illustrated in FIG. 1, the beam-forming controller 170 can also comprise control inputs 172 and control outputs 174. The control inputs 172 can be for receiving inputs identifying multiple desired characteristics of the transmitted beam $B_T$.

To set the transmitter 100 so that the transmitted beam $B_T$ has all of the multiple desired characteristics, the beam-forming controller 170 can determine N sets of combined parameter values $A1_\Sigma(i)$, $\psi1_\Sigma(i)$, $A2_\Sigma(i)$, $\psi2_\Sigma(i)$ for the N signal modifiers 108, 148, 158. A combined value can comprise multiple individual values that are combined in some fashion. For example, a combined value can be a sum, a weighted sum, an average, a weighted average, a product, or the like of the individual values. The summation symbol $\Sigma$, as used herein, means that the individual elements are combined in any of the foregoing ways, and the subscript $_\Sigma$ denotes a parameter value that is the combination of more than one individual parameter value.

Combined parameter values $A1_\Sigma(i)$, $A2_\Sigma(i)$, $\psi1_\Sigma(i)$, $\psi2_\Sigma(i)$ for the amplitude controllers CA1(i), CA2(i) 122, 132 and the phase controllers C$\psi$1(i), C$\psi$2(i) 124, 134 of the $i^{th}$ signal modifier 108, 148, 158 that affect M (where M is an integer greater than one) number of characteristics CH1, CH2, . . . , CHM of the transmitted beam $B_T$ can be as follows:

$$A1_\Sigma(i) = \Sigma(A1_{CH1}(i), A1_{CH2}(i), \ldots, A1_{CHM}(i)),$$

where:
- $A1_{CH1}(i)$ is the amplitude value parameter for the amplitude controller CA1(i) 122 in the first path 105 in the $i^{th}$ signal modifier 108, 148, 158 for the first desired characteristic of the transmitted beam $B_T$;
- $A1_{CH2}(i)$ is the amplitude value parameter for the amplitude controller CA1(i) 122 in the first path 105 in the $i^{th}$ signal modifier 108, 148, 158 for the second desired characteristic of the transmitted beam $B_T$; and
- $A1_{CHM}(i)$ is the amplitude value parameter for the amplitude controller CA1(i) 122 in the first path 105 in the $i^{th}$ signal modifier 108, 148, 158 for the $M^{th}$ desired characteristic of the transmitted beam $B_T$.

$$A2_\Sigma(i) = \Sigma(A2_{CH1}(i), A2_{CH2}(i), \ldots, A2_{CHM}(i)),$$

where:
- $A2_{CH1}(i)$ is the amplitude value parameter for the amplitude controller CA2(i) 132 in the second path 106 of the $i^{th}$ signal modifier 108, 148, 158 for the first desired characteristic of the transmitted beam $B_T$;
- $A2_{CH2}(i)$ is the amplitude value parameter for the amplitude controller CA2(i) 132 in the second path 106 of the $i^{th}$ signal modifier 108, 148, 158 for the second desired characteristic of the transmitted beam $B_T$; and
- $A2_{CHM}(i)$ is the amplitude value parameter for the amplitude controller CA2(i) 132 in the second path 106 of the $i^{th}$ signal modifier 108, 148, 158 for the $M^{th}$ desired characteristic of the transmitted beam $B_T$.

$$\psi1_\Sigma(i) = \Sigma(\psi1_{CH1}(i), \psi1_{CH2}(i), \ldots, \psi1_{CHM}(i)),$$

where:
- $\psi1_{CH1}(i)$ is the phase-shift parameter value for the phase controller C$\psi$1(i) 124 in the first path 105 in the $i^{th}$ signal modifier 108, 148, 158 for the first desired characteristic of the transmitted beam $B_T$;
- $\psi1_{CH2}(i)$ is the phase-shift parameter value for the phase controller C$\psi$1(i) 124 in the first path 105 in the $i^{th}$ signal modifier 108, 148, 158 for the second desired characteristic of the transmitted beam $B_T$;
- $\psi1_{CHM}(i)$ is the phase-shift parameter value for the phase controller C$\psi$1(i) 124 in the first path 105 in the $i^{th}$ signal modifier 108, 148, 158 for the $M^{th}$ desired characteristic of the transmitted beam $B_T$.

$$\psi 2_\Sigma(i) = \Sigma(\psi 2_{CH1}(i), \psi 2_{CH2}(i), \ldots, \psi 2_{CHM}(i)),$$

where:
- $\psi 2_{CH1}(i)$ is the phase-shift parameter value for the phase controller C$\psi$2(i) 134 in the second path 106 in the $i^{th}$ signal modifier 108, 148, 158 for the first desired characteristic of the transmitted beam $B_T$;
- $\psi 2_{CH2}(i)$ is the phase-shift parameter value for the phase controller C$\psi$2(i) 134 in the second path 106 in the $i^{th}$ signal modifier 108, 148, 158 for the second desired characteristic of the transmitted beam $B_T$; and
- $\psi 2_{CHM}(i)$ is the phase-shift parameter value for the phase controller C$\psi$2(i) 134 in the second path 106 in the $i^{th}$ signal modifier 108, 148, 158 for the $M^{th}$ desired characteristic of the transmitted beam $B_T$.

In the foregoing, some of the parameter values can be zero.

Upon receiving a set of M desired characteristics of the transmitted beam $B_T$, the beam-forming controller 170 can thus determine N sets of amplitude and phase-shift parameters for the N signal modifiers 108, 148, 158 as follows: for i=1 to N, determine an $i^{th}$ set of combined amplitude and phase-shift parameters {A1$_\Sigma$(i), A2$_\Sigma$(i), $\psi 1_\Sigma$(i), $\psi 2_\Sigma$(i)} per the formulas above. The beam-forming controller 170 can also load the N sets of combined amplitude and phase-shift parameters {A1$_\Sigma$(i), A2$_\Sigma$(i), $\psi 1_\Sigma$(i), $\psi 2_\Sigma$(i)} into the corresponding signal modifiers 108, 148, 158.

The beam-forming controller 170 can be configured to calculate the individual amplitude and phase-shift parameters needed to determine the N sets of combined amplitude and phase-shift parameters {A1$_\Sigma$(i), A2$_\Sigma$(i), $\psi 1_\Sigma$(i), $\psi 2_\Sigma$(i)}. As another example, amplitude and phase-shift parameters can be pre-stored in the memory 178 and utilized by the processor 176 to determine the N sets of combined amplitude and phase-shift parameters {A1$_\Sigma$(i), A2$_\Sigma$(i), $\psi 1_\Sigma$(i), $\psi 2_\Sigma$(i)}.

Figure 3:
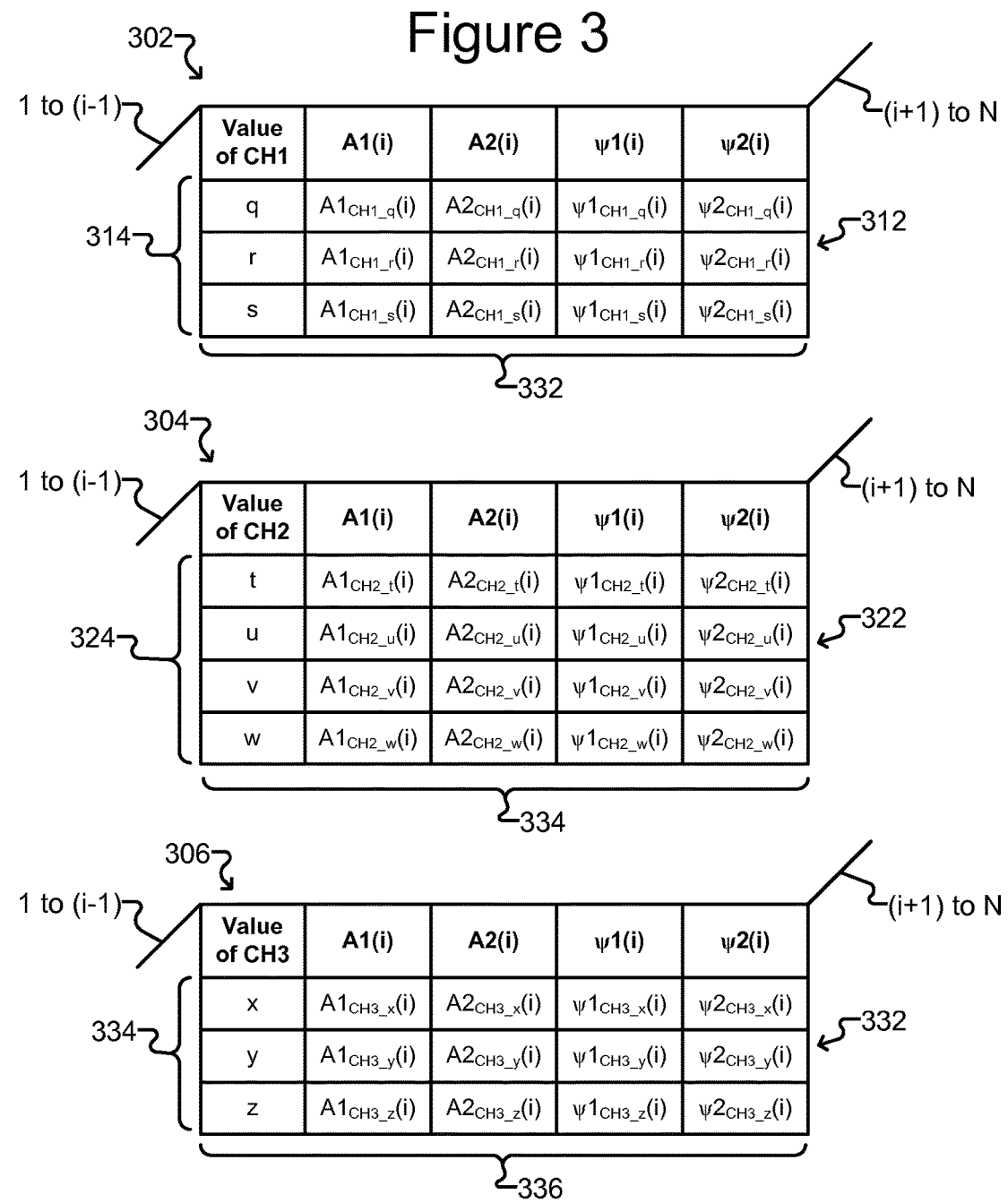
FIG. 3 is an example of memory structures for storing amplitude and phase-shift parameter values for the signal modifiers of FIG. 1 that correspond to controllable characteristics of the combined beam transmitted by the transmitter of FIG. 1 according to some embodiments of the invention.

FIG. 3 illustrates an example for storing amplitude and phase-shift parameters for three different characteristics of the transmitted beam $B_T$. Other embodiments, however, can store amplitude and phase-shift parameters for fewer or more than three characteristics of the transmitted beam $B_T$.

In the example illustrated in FIG. 3, there is a memory structure 302, 304, 306 for each of the three different characteristics CH1, CH2, CH3 of the transmitted beam $B_T$ to be controlled. The three transmitted beam $B_T$ characteristics CH1, CH2, CH3 can be, for example, a steering direction, a side-lobe taper, and a polarization of the transmitted beam $B_T$. The memory structures 302, 304, 306 can be, for example, part of the memory 178 of the beam-forming controller 170.

Each memory structure 302, 304, 306 can comprise N tables 312, 322, 332, one for each of the N signal modifiers 108, 148, 158. Each table 312, 322, 332 can comprise a column for each of the two amplitude parameters A1(i), A2(i) and the two phase-shift parameters $\psi 1$(i), $\psi 2$(i) for one of the signal modifiers 108, 148, 158, and each table 312, 322, 332 can also have a row 314, 324, 334 for each possible value of the beam characteristic CH1, CH2, CH3. The $i^{th}$ table 312, 322, 332 in each memory structure 302, 304, 306 is illustrated in FIG. 3 and discussed below. It is understood, however, that there are i=1 through N such tables 312, 322, 332 in each memory structure 302, 304, 306.

In the example of FIG. 3, there are three possible values q, r, s of the first beam characteristic CH1, and the $i^{th}$ table 312, therefore, has three rows. The values A1$_{CH1\_q}$(i), A2$_{CH1\_q}$(i), $\psi 1_{CH1\_q}$(i), $\psi 2_{CH1\_q}$(i) in the q row 314 are parameter values for the $i^{th}$ signal modifier 108, 148, 158 that will result in the transmitted beam $B_T$ having the q value of the first beam characteristic CH1. The values A1$_{CH1\_r}$(i), A2$_{CH1\_r}$(i), $\psi 1_{CH1\_r}$(i), $\psi 2_{CH1\_r}$(i) in the r row 314 are similarly parameter values for the $i^{th}$ signal modifier 108, 148, 158 that will result in the transmitted beam $B_T$ having the r value of the first beam characteristic CH1; and the values A1$_{CH1\_s}$(i), A2$_{CH1\_s}$(i), $\psi 1_{CH1\_s}$(i), $\psi 2_{CH1\_s}$(i) in the s row 314 are similarly parameter values for the $i^{th}$ signal modifier 108, 148, 158 that will result in the transmitted beam $B_T$ having the s value of the first beam characteristic CH1.

The example of FIG. 3 includes four possible values t, u, v, w for the second beam characteristic CH2, and the $i^{th}$ table 322, therefore, has four rows. The values A1$_{CH2\_t}$(i), A2$_{CH2\_t}$(i), $\psi 1_{CH2\_t}$(i), $\psi 2_{CH2\_t}$(i) in the t row 324 are parameter values for the $i^{th}$ signal modifier 108, 148, 158 that will result in the transmitted beam $B_T$ having the t value of the second beam characteristic CH2; and the values A1$_{CH2\_u}$(i), A2$_{CH2\_u}$(i), $\psi 1_{CH2\_u}$(i), $\psi 2_{CH2\_u}$(i) in the u row 324 are parameter values for the $i^{th}$ signal modifier 108, 148, 158 that will result in the transmitted beam $B_T$ having the u value of the second beam characteristic CH2. Similarly, the values A1$_{CH2\_v}$(i), A2$_{CH2\_v}$(i), $\psi 1_{CH2\_v}$(i), $\psi 2_{CH2\_v}$(i) in the v row 324 are parameter values for the $i^{th}$ signal modifier 108, 148, 158 that will result in the transmitted beam $B_T$ having the v value of the second beam characteristic CH2; and the values A1$_{CH2\_w}$(i), A2$_{CH2\_w}$(i), $\psi 1_{CH2\_w}$(i), $\psi 2_{CH2\_w}$(i) in the w row 324 are parameter values for the $i^{th}$ signal modifier 108, 148, 158 that will result in the transmitted beam $B_T$ having the w value of the second beam characteristic CH2.

In the example of FIG. 3, there are three possible values x, y, z for the third beam characteristic CH3, and the $i^{th}$ table 332, therefore, has three rows. The values A1$_{CH3\_x}$(i), A2$_{CH3\_x}$(i), $\psi 1_{CH3\_x}$(i), $\psi 2_{CH3\_x}$(i) in the x row 334 are parameter values for the $i^{th}$ signal modifier 108, 148, 158 that will result in the transmitted beam $B_T$ having the x value of the third beam characteristic CH3. The values A1$_{CH3\_y}$(i), A2$_{CH3\_y}$(i), $\psi 1_{CH3\_y}$(i), $\psi 2_{CH3\_y}$(i) in the y row 334 are similarly parameter values for the $i^{th}$ signal modifier 108, 148, 158 that will result in the transmitted beam $B_T$ having the y value of the third beam characteristic CH3; and the values A1$_{CH3\_z}$(i), A2$_{CH3\_z}$(i), $\psi 1_{CH3\_z}$(i), $\psi 2_{CH3\_z}$(i) in the z row 334 are similarly parameter values for the $i^{th}$ signal modifier 108, 148, 158 that will result in the transmitted beam $B_T$ having the z value of the third beam characteristic CH3.

The memory structures 302, 304, 306 in FIG. 3 are but examples, and variations are possible. For example, there can be sufficient memory structures 302, 304, 306 for fewer or more than three characteristics of the transmitted beam $B_T$. As another example, there can be fewer or more than three possible values q, r, s for the first characteristic CH1, four possible values t, u, v, w of the second characteristic CH2, and three possible values x, y, z for the third characteristic CH3.

FIGS. 4A-4D illustrate an example by which the beam-forming controller 170 can utilize the memory structures 302, 304, 306 to determine combined values for the amplitude and phase-shift parameters A1$_\Sigma$(i), A2$_\Sigma$(i), $\psi 1_\Sigma$(i), $\psi 2_\Sigma$(i) that cause the transmitted beam $B_T$ to have specific values of the three characteristics CH1, CH2, CH3. In the example of FIGS. 4A-4D, the three specific values are as follows: s is the specific value of the first characteristic CH1 to which the transmitted beam $B_T$ is to be set, t is the specific value of the second characteristic CH2 to which the transmitted beam $B_T$ is to be set, and y is the specific value of the third characteristic CH3 to which the transmitted beam $B_T$ is to be set.

Figure 4A:
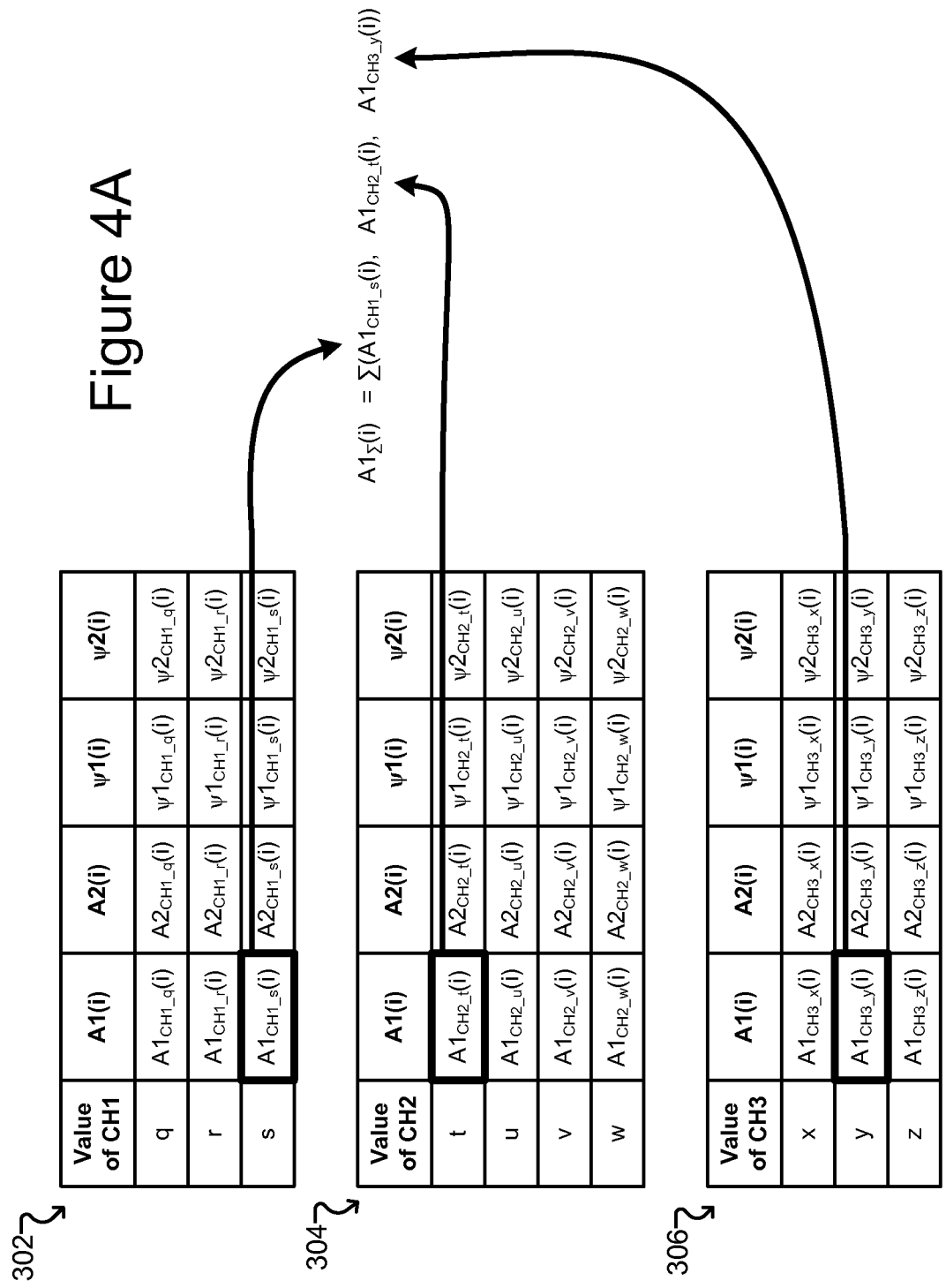

As illustrated in FIG. 4A, to determine the combined parameter value $A1_\Sigma(i)$ for the amplitude controller CA1(i) in the first path 105 of the $i^{th}$ signal modifier 108, 148, 158, the beam-forming controller 170 can combine the A1(i) parameter value $A1_{CH1\_s}(i)$ from the s row of the memory structure 302 of the first beam characteristic CH1 with the A1(i) parameter value $A1_{CH2\_t}(i)$ from the t row of the memory structure 304 for the second beam characteristic CH2 and with the A1(i) parameter value $A1_{CH3\_y}(i)$ from the y row of the memory structure 306 for the third beam characteristic CH3.

As illustrated in FIG. 4B, to determine the combined parameter value $A2_\Sigma(i)$ for the amplitude controller CA2(i) in the second path 106 of the $i^{th}$ signal modifier 108, 148, 158, the beam-forming controller 170 can combine the A2(i) parameter value $A2_{CH1\_s}(i)$ from the s row of the memory structure 302 of the first beam characteristic CH1 with the A2(i) parameter value $A2_{CH2\_t}(i)$ from the t row of the memory structure 304 for the second beam characteristic CH2 and with the A2(i) parameter value $A2_{CH3\_y}(i)$ from the y row of the memory structure 306 for the third beam characteristic CH3.

As can be seen in FIG. 4C, to determine the combined parameter value $\psi 1_\Sigma(i)$ for the phase-shift controller C$\psi$1(i) in the first path 105 of the $i^{th}$ signal modifier 108, 148, 158, the beam-forming controller 170 can combine the $\psi$1(i) parameter value $\psi 1_{CH1\_s}(i)$ from the s row of the memory structure 302 of the first beam characteristic CH1 with the $\psi$1(i) parameter value $\psi 1_{CH2\_t}(i)$ from the t row of the memory structure 304 for the second beam characteristic CH2 and with the $\psi$1(i) parameter value $\psi 1_{CH3\_y}(i)$ from the y row of the memory structure 306 for the third beam characteristic CH3.

Figure 4D:
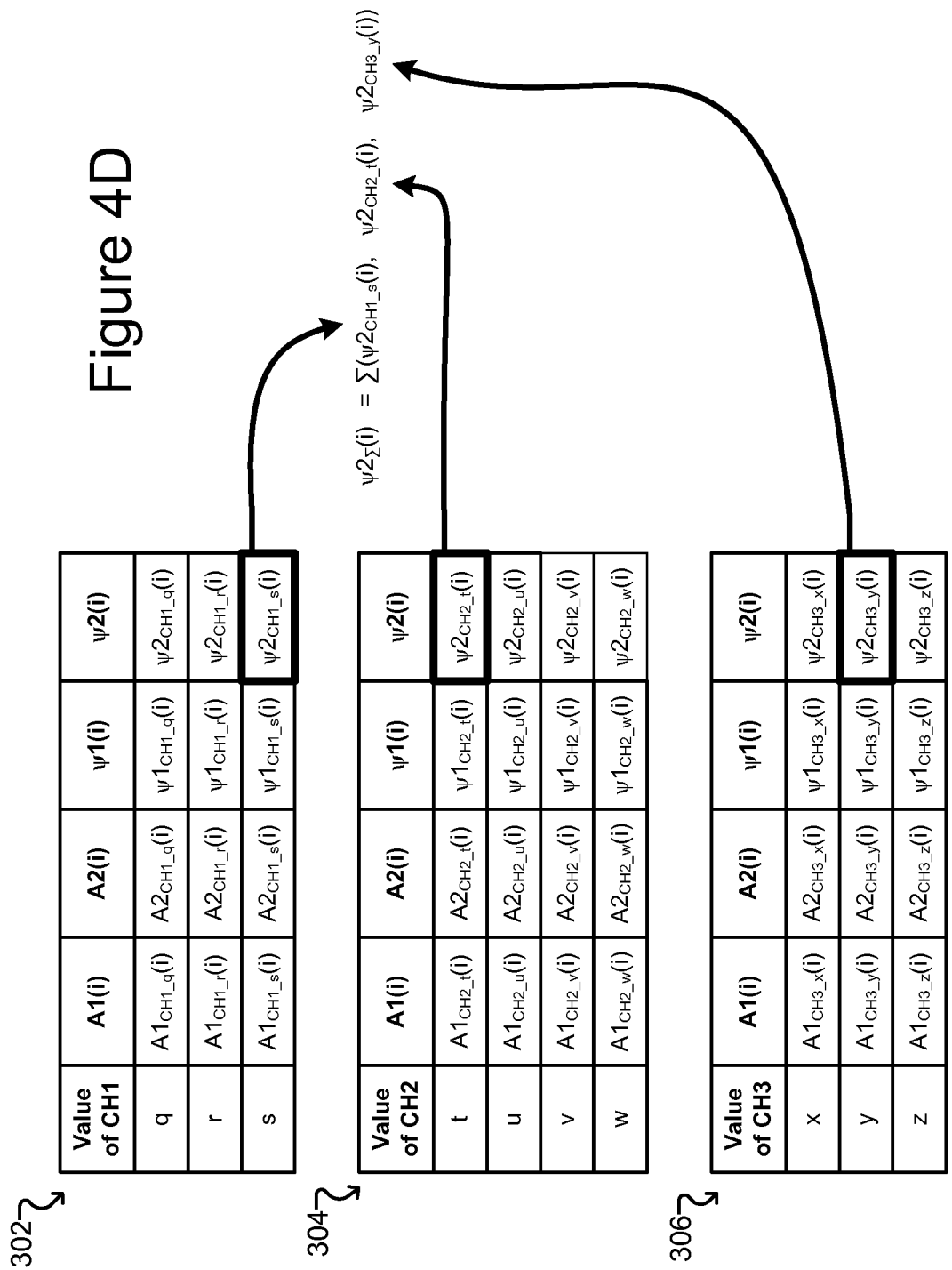

As illustrated in FIG. 4D, to determine the combined parameter value $\psi 2_\Sigma(i)$ for the phase-shift controller C$\psi$2(i) in the second path 106 of the $i^{th}$ signal modifier 108, 148, 158, the beam-forming controller 170 can combine the $\psi$2(i) parameter value $\psi 2_{CH1\_s}(i)$ from the s row of the memory structure 302 of the first beam characteristic CH1 with the $\psi$2(i) parameter value $\psi 2_{CH2\_t}(i)$ from the t row of the memory structure 304 for the second beam characteristic CH2 and with the $\psi$2(i) parameter value $\psi 2_{CH3y}(i)$ from the y row of the memory structure 306 for the third beam characteristic CH3.

The beam-forming controller 170 can then load the combined parameter values $A1_\Sigma(i), A2_\Sigma(i), \psi 1_\Sigma(i), \psi 2_\Sigma(i)$ into the $i^{th}$ signal modifier 108, 148, 158. The beam-forming controller 170 can repeat the process illustrated in FIGS. 4A-4D for i=1 to N, and thus, load into each of the N signal modifiers 108, 148, 158 a set of combined parameter values for i=1 to N $\{A1_\Sigma(i), A2_\Sigma(i), \psi 1_\Sigma(i), \psi 2_\Sigma(i)\}$, which can cause the transmitted beam $B_T$ to have the s value of the first characteristic CH1, the t value of the second characteristic CH2, and the y value of the third characteristic CH3.

In a non-limiting, particular example, the controllable beam characteristics of the transmitted beam $B_T$ can be steering direction, side-lobe taper, and polarization. In such an example, the individual parameters A1(i), A2(i), $\psi$1(i), $\psi$2(i) for the $i^{th}$ signal modifier 108, 148, 158 that affect the steering direction can be as follows: A1(i) and A2(i) are negligible and can be zero; $\psi$1(i), $\psi$2(i) are equal to each other and their values affect the steering direction of the transmitted beam $B_T$. Steering direction can thus be defined with one phase-shift parameter per signal modifier 108, 148, 158 the $i^{th}$ one of which is designated $\psi_{SD}(i)$ herein. With respect to side-lobe taper, the individual parameters A1(i), A2(i), $\psi$1(i), $\psi$2(i) for the $i^{th}$ signal modifier 108, 148, 158 that affect the transmitted beam $B_T$ can be as follows: A1(i) and A2(i) are equal to each other and their values affect the side-lobe taper of the transmitted beam $B_T$; $\psi$1(i), $\psi$2(i) are negligible and can be zero. Side-lobe taper can thus be defined with one amplitude parameter per signal modifier 108, 148, 158 the $i^{th}$ one of which is designated $A_T(i)$ herein. With respect to polarization, all of the individual parameters A1(i), A2(i), $\psi$1(i), $\psi$2(i) affect the transmitted beam $B_T$. Polarization can thus be defined with two amplitude parameters and two phase-shift parameters per signal modifier 108, 148, 158 the $i^{th}$ ones of which are designated $A_{P1}(i), A_{P2}(i), \psi_{P1}(i), \psi_{P2}(i)$ herein. The combined parameter value set into the $i^{th}$ signal modifier 108, 148, 158 for i=1 to N to control the steering direction, side-lobe taper, and polarization of the combined beam $B_T$ can be as follows: $A1_\Sigma(i)=\Sigma(A_T(i), A_{P1}(i)); A2_\Sigma(i)=\Sigma(A_T(i), A_{P2}(i)); \psi 1_\Sigma(i)=\Sigma(\psi_{SD}(i), \psi_{P1}(i));$ and $\psi 2_\Sigma(i)=\Sigma(\psi_{SD}(i), \psi_{P2}(i))$.

Figure 5:
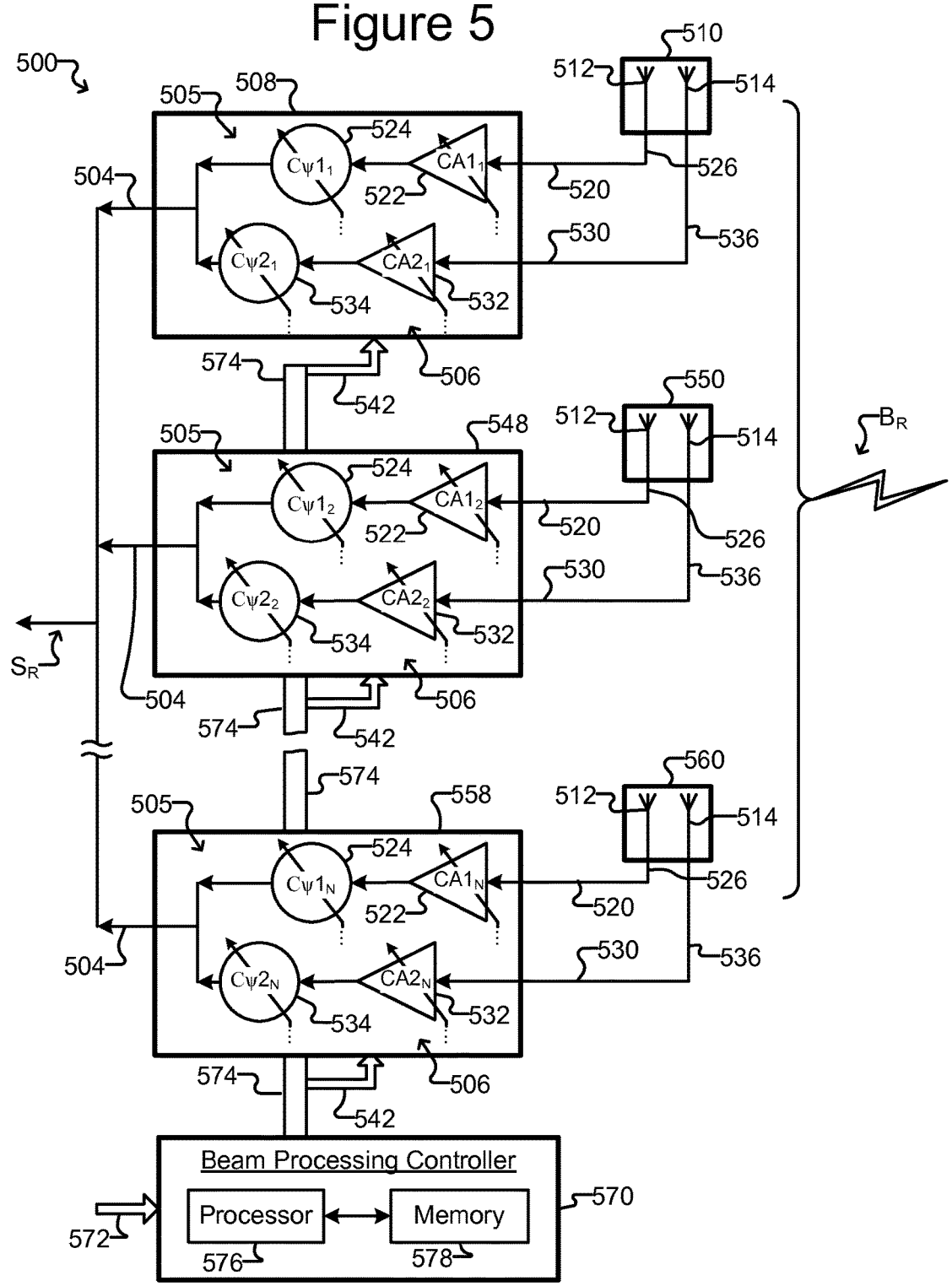
FIG. 5 illustrates an example of a receiver according to some embodiments of the invention.

As noted, FIG. 1 illustrates an example of a transmitter 100. FIG. 5 shows an example of a receiver 500, which can be part of a receive-only RF communications system or an RF transceiver. As will be seen, the receiver 500 can be generally similar to the transmitter 100 but operate in reverse to receive a beam $B_R$ propagated from a distant transmitter (not shown) at N dual-orthogonally polarized antenna elements 510, 550, 560 and process the outputs of the N antenna elements 510, 550, 560 in N signal modifiers 508, 548, 558.

Like the antenna elements 110, 150, 160 of FIG. 1, the antenna elements 510, 550, 560 can be dual-orthogonally polarized antenna elements each of which can be modeled as having a first antenna component 512 and a second antenna component 514 that is orthogonal to the first antenna component 512 as discussed above. The first antenna component 512 can be connected to a first signal output 526, and the second antenna component 514 can be connected to a second signal output 536. Because the outputs 526, 536 are connected to orthogonally polarized antenna components 512, 514, the outputs 526, 536 are referred to herein as orthogonal outputs regardless of whether the outputs 526, 536, are physically orthogonal to each other.

The first output 526 of an antenna element 510, 550, 560 can be connected to a first input 520 to a first processing path 505 in a corresponding signal modifier 508, 548, 558. Similarly, the second output 536 can be connected to a second input 530 of a second processing path 506 in the corresponding signal modifier 508, 548, 558.

The first processing path 505 in each signal modifier 508, 548, 558 can comprise a first path amplitude controller 522 and a first path phase-shift controller 524, which can be similar to or the same as the first path amplitude controllers 122 and first path phase-shift controllers 124 in FIG. 1. The second processing path 506 in each signal modifier 508, 548, 558 can likewise comprise a second path amplitude controller 532 and a second path phase-shift controller 534, which can be similar to or the same as the second path amplitude controllers 132 and second path phase-shift controllers 134 in FIG. 1.

The results of the signal processing in the first path 505 and the second path 506 can be combined in each signal modifier 508, 548, 558 (e.g., utilizing a signal combiner (not shown)). The outputs 504 of the signal combiners 508, 548, 558 can then be combined to produce a communications signal $S_R$ from the received beam $B_R$.

The beam-processing controller 570 can set and change the values of amplitude and phase-shift parameters in the signal modifiers 508, 548, 558 to correspond to known or predicted characteristics of the received beam $B_R$ generally in any of the ways discussed above by which the beam-forming controller 170 of FIG. 1 changes such parameters in the signal modifiers 108, 148, 158 as discussed above. The beam-processing controller 570 can output amplitude and phase parameter values through its output 574 to control inputs 542 of the signal modifiers 508, 548, 558. The beam-processing controller 570 can comprise a control input 572 through which it can receive values for a plurality of beam characteristics of the received beam $B_R$. The beam-processing controller 570 can comprise a controller 576 and a memory 578, which can be like the processor 176 and memory 178 of the beam-forming controller 170 of FIG. 1 as described above. The beam-processing controller 570 can thus be structured and/or operate in any manner discussed above with respect to the beam-forming controller 170.

FIG. 6 illustrates an example of a process 600 by which the transmitter 100 of FIG. 1 or the receiver 500 of FIG. 5 can be operated.

As shown, at step 602, the process 600 can set the transmitter 100 to transmit the combined transmitted beam $B_T$ or the receiver 500 to process the received beam $B_R$ in accordance with a plurality of desired characteristics of the transmitted beam $B_T$ or expected characteristics of the received beam $B_R$. The process 600 can do so by, for example, determining combined parameter value sets $\{A1_\Sigma(i), A2_\Sigma(i), \psi1_\Sigma(i), \psi2_\Sigma(i)\}$ for each of the signal modifiers 108, 148, 158 that produce the desired characteristics in the transmitted beam $B_T$ as discussed above. Alternatively, the process 600 can do so with respect to the signal modifiers 508, 548, 558 in FIG. 5 to produce the expected characteristics in the received beam $B_R$ as discussed above.

At step 604, the process 600 can transmit communication signals $S_T$ in a transmitted beam $B_T$ having the beam characteristics set at step 602 as discussed above. Alternatively, in order to receive communications signal $S_R$, the process 600 can receive and process a beam $B_R$, expected to have the beam characteristics set at step 602 as discussed above.

At step 606, the process 600 can determine whether to change any of the beam characteristics set at step 602. If yes, the process 600 can return to step 602 to set new beam characteristics. If no, the process 600 can return to step 604 to continue transmitting communication signals $S_T$ via transmitted beams $B_T$ or receiving communication signals $S_R$ via received beams $B_R$. Regardless, the process 600 can continue transmitting or receiving at step 604 while also performing steps 602, 606.

FIGS. 7A-9B illustrate an example application of some embodiments of a phased-array antenna system for electronically controlling multiple characteristics of an RF beam. In this example, the RF beam 722 is a linear polarized RF beam 722 transmitted between a first RF station 700 and a second RF station 712 at least one of which comprises a phased-array antenna system 702. The phased-array antenna system 702 can comprise the transmitter 100 of FIG. 1 and/or the receiver 500 of FIG. 5 and can perform, for example, the process 600 of FIG. 6.

In the example shown in FIGS. 7A-9B and discussed below, the first RF station 700 is stationary, and the second RF station 712 is mobile. Alternatively, the first RF station 700 can be mobile and the second RF station stationary 712, or both stations 700, 712 can be mobile. Also, although the first RF station 700 is illustrated in the figures and discussed below as comprising a phased-array antenna system 702, the phased-array antenna system 702 can alternatively be part of the second RF station 712, or both of the RF stations 700, 712 can comprise a phased-array antenna system like system 702. In addition, at least one of the first RF station 700 or the second RF station 712 can comprise at least an RF transmitter, and the other of the RF stations 700, 712 can comprise at least an RF receiver. The linear polarized RF beam 722 can thus be transmitted from either the first RF station 700 or the second RF station 712.

Figure 7A:
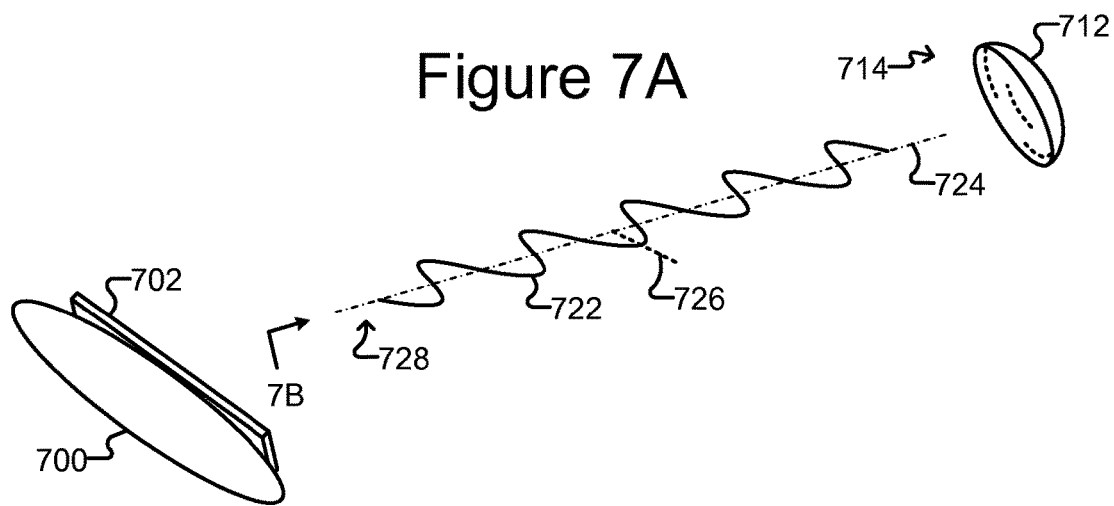
FIGS. 7A-9B illustrate an example in which the steering direction and polarization angle of a linear polarized beam are changed to track a moving target according to some embodiments of the invention.
Figure 7B:
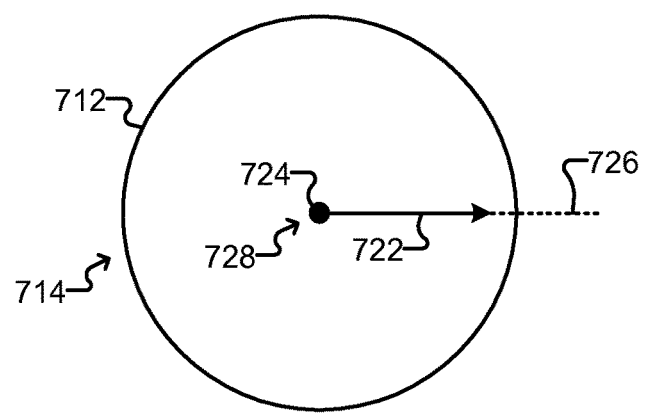

As noted, the RF beam 722 can be a linear polarized beam and can thus propagate along an axis 724 with a particular linear polarization angle. FIGS. 7A and 7B illustrate an example in which the steering direction (i.e., the orientation of the propagation axis 724) of the beam 722 is set to a steering direction A 728 that points at location A 714 of the second RF station 712, and the polarization angle 726 of the beam 722 is set to correspond to a linear polarization orientation of the second RF station 712 at location A 714. The phased-array antenna system 702 can set the steering direction A 728 and polarization angle A 726 of the beam 722 per step 602 of FIG. 6 as discussed above.

As is known, the instantaneous electric field intensity of a linear polarized beam oscillates about its axis of propagation in a plane that passes through that axis. The polarization angle can be the angle of the plane with respect to the angle of a reference plane that also passes through the propagation axis. In the examples, illustrated in FIGS. 7A-9B, the polarization angle 726 shown in FIG. 7B can be deemed to correspond to the reference plane (not shown) and thus be zero. The polarization angles 826 and 926 can be, respectively, the A-B delta polarization angle 836 (discussed below) and the sum of the A-B delta polarization angle 836 and the B-C delta polarization angle 936 (also discussed below).

As discussed above, the steering direction 728 can correspond to the values of the phase shift parameters $\psi1(i)$, $\psi2(i)$ in the phase controllers 124, 134 in each of the N signal modifiers 108, 148, 158 of the transmitter 100 of FIG. 1 (if the phased-array antenna system 702 comprises the transmitter 100) or the phase controllers 524, 534 in each of the N signal modifiers 508, 548, 558 of the receiver 500 of FIG. 5 (if the phased-array antenna system 702 comprises the receiver 500). Also in accordance with discussions above, the polarization angle 726 can correspond to the values of the amplitude parameters $A1(i)$, $A2(i)$ in the amplitude controllers 122, 132 and the values of the phase shift parameters $\psi1(i)$, $\psi2(i)$ in the phase controllers 124, 134 in each of the N signal modifiers 108, 148, 158 of the transmitter 100 of FIG. 1 or the amplitude controllers 522, 532 and phase controllers 524, 534 in each of the N signal modifiers 508, 548, 558 of the receiver 500 of FIG. 5.

The steering direction A 728 and the polarization angle A 726 can thus be set in the phased-array antenna system 702 as follows: the amplitude parameters $A1(i)$, $A2(i)$ in the amplitude controllers 122, 132 (or 522, 532) in each of the N signal modifiers 108, 148, 158 (or 508, 548, 558) can be set to values $A1_{PA}(i)$, $A2_{PA}(i)$ corresponding to the polarization angle A 726; and the phase shift parameters $\psi1(i)$, $\psi2(i)$ in the phase shift controllers 124, 134 (or 524, 534) in each of the N signal modifiers 108, 148, 158 (or 508, 548, 558) can be set to combined values $\psi1_{\Sigma A}(i)$, $\psi2_{\Sigma A}(i)$ corresponding to the polarization angle A 726 and the steering direction A 728. The combined value $\psi1_{\Sigma A}(i)$ can be a combination of a value $\psi1_{PA}(i)$ corresponding to the polarization angle A 726 and a value $\psi1_{SDA}(i)$ corresponding to the steering direction A 728, and the combined value $\psi2_{\Sigma A}(i)$ can likewise be a combination of a value $\psi2_{PA}(i)$ corresponding to the polarization angle A 726 and a value $\psi2_{SDA}(i)$ corresponding to the steering direction A 728. This can be expressed as follows: $\psi1_{\Sigma A}(i)=\Sigma(\psi1_{PA}(i), \psi1_{SDA}(i))$; and $\psi2_{\Sigma A}(i)=\Sigma(\psi2_{PA}(i), \psi2_{SDA}(i))$.

As illustrated in FIGS. 8A-9B, as the second RF station 712 moves along a motion path 802, the phased-array antenna system 702 can repeatedly change the steering direction and polarization angle of the beam 722 to follow the motion 802 of the second RF station 712. The motion of the second RF station 712 along motion path 802 can be a continuous motion. Locations A 714, B 814, and C 914 can thus be merely points along a continuous motion path 802 of the second RF station 712.

Figure 8A:
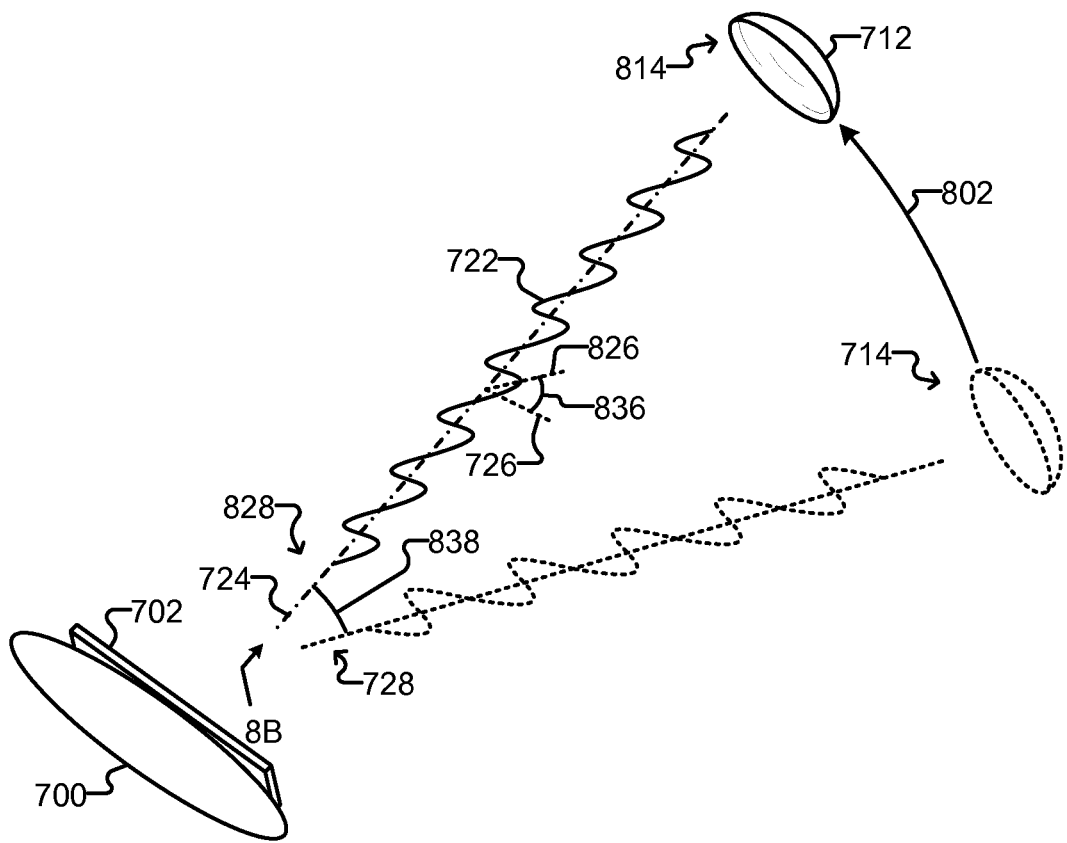
Figure 8B:
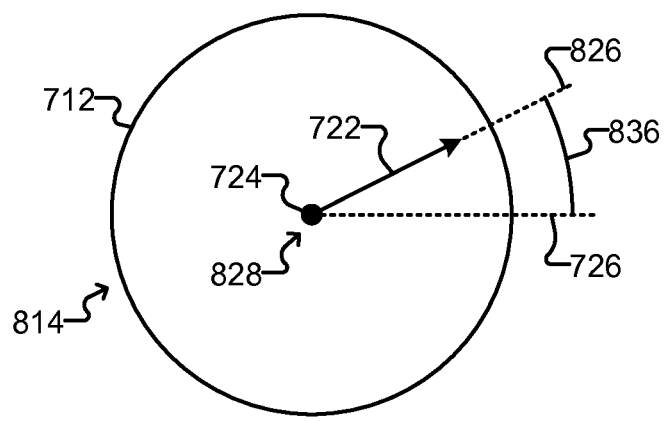

FIGS. 8A and 8B illustrate an example in which the second RF station 712 moves along the path 802 from position A 714 to position B 814. The phased-array antenna system 702 accordingly changes the steering direction of the beam 722 from steering direction A 728 to steering direction B 828, and the phased-array antenna system 702 also changes the polarization angle of the beam 722 from polarization angle A 726 to polarization angle B 826. (In FIGS. 8A and 8B, a change from steering direction A 728 to steering direction B 828 is identified as A-B delta steering direction 838, and a change from polarization angle A 726 to polarization angle B 826 is identified as A-B delta polarization angle 836.) As shown in FIGS. 8A and 8B, the steering direction B 828 points the beam 722 at location B 814, and the polarization angle B 826 corresponds to the polarization orientation of the second RF station 712 at location B 814. The phased-array antenna system 702 can change the steering direction of the beam 722 from steering direction A 728 to steering direction B 828 and the polarization angle from polarization angle A 726 to polarization angle B 826, for example, at steps 606 and 602 while performing process 600 of FIG. 6.

The steering direction B 828 and the polarization angle B 826 can thus be set in the phased-array antenna system 702 as follows: the amplitude parameters A1(i), A2(i) in the amplitude controllers 122, 132 (or 522, 532) in each of the N signal modifiers 108, 148, 158 (or 508, 548, 558) can be set to values $A1_{PB}(i), A2_{PB}(i)$ corresponding to the polarization angle B 826; and the phase shift parameters $\psi1(i)$, $\psi2(i)$ in the phase shift controllers 124, 134 (or 524, 534) in each of the N signal modifiers 108, 148, 158 (or 508, 548, 558) can be set to combined values $\psi1_{\Sigma B}(i), \psi2_{\Sigma B}(i)$ corresponding to the polarization angle B 826 and the steering direction B 828. This can be expressed as follows: $\psi1_{\Sigma B}(i)=\Sigma(\psi1_{PB}(i), \psi1_{SDB}(i))$; and $\psi2_{PB}(i)=\Sigma(\psi2_{PB}(i), \psi2_{SDB}(i))$.

Figure 9A:
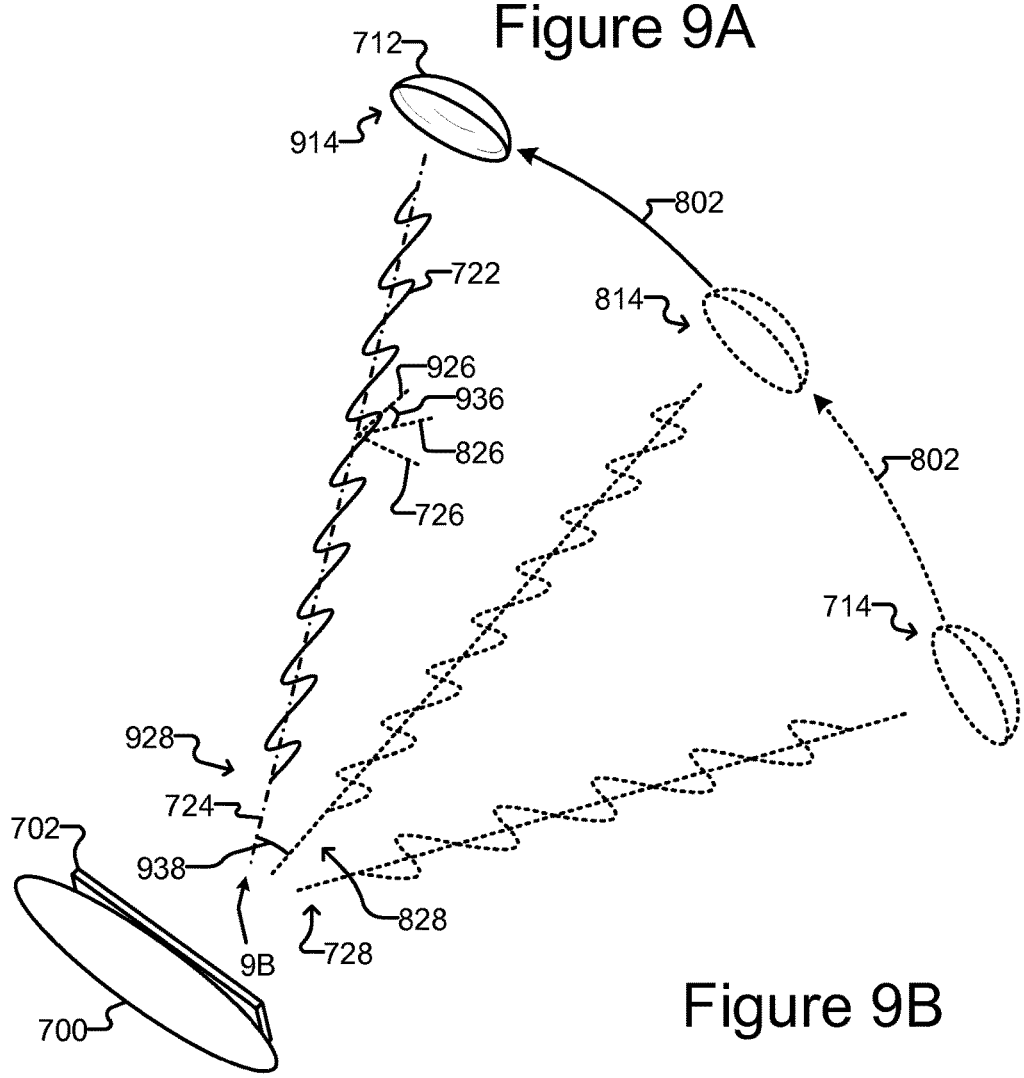
Figure 9B:
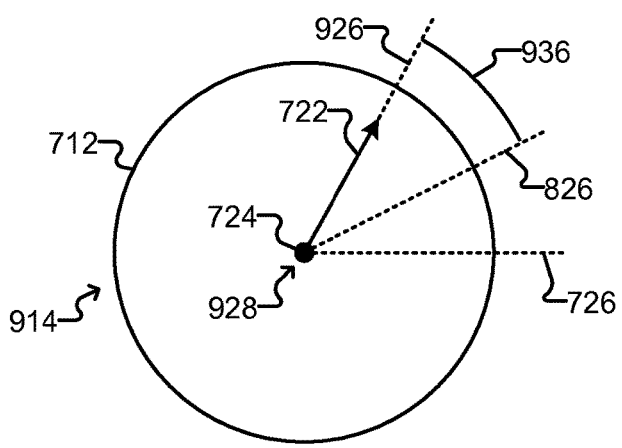

FIGS. 9A and 9B show the second RF station 712 at yet another position C as it moves along the path 802. The phased-array antenna system 702 accordingly changes the steering direction of the beam 722 from steering direction B 828 to steering direction C 928 and the polarization from polarization B 828 to polarization C 928. In FIGS. 9A and 9B, a change from steering direction B 828 to steering direction C 928 is identified as B-C delta steering direction 938, and a change from polarization angle B 826 to polarization angle C 926 is identified as B-C delta polarization angle 936. As shown in FIGS. 9A and 9B, the steering direction C 928 points the beam 722 at location C, and the polarization C corresponds to the polarization orientation of the second RF station 712 at location C 914. Again, the phased-array antenna system 702 can do so at steps 606 and 602 while performing process 600 of FIG. 6.

The steering direction C 928 and the polarization angle C 926 can thus be set in the phased-array antenna system 702 as follows: the amplitude parameters A1(i), A2(i) in the amplitude controllers 122, 132 (or 522, 532) in each of the N signal modifiers 108, 148, 158 (or 508, 548, 558) can be set to values $A1_{PC}(i), A2_{PC}(i)$ corresponding to the polarization angle C 926; and the phase shift parameters $\psi1(i)$, $\psi2(i)$ in the phase shift controllers 124, 134 (or 524, 534) in each of the N signal modifiers 108, 148, 158 (or 508, 548, 558) can be set to combined values $\psi1_{\Sigma C}(i), \psi2_{\Sigma C}(i)$ corresponding to the polarization angle C 926 and the steering direction C 928. This can be expressed as follows: $\psi1_{\Sigma C}(i)=\Sigma(\psi1_{PC}(i), \psi1_{SDC}(i))$; and $\psi2_{\Sigma C}(i)=\Sigma(\psi2_{PC}(i), \psi2_{SDC}(i))$.

The phased-array antenna system 702 can thus repeatedly change the steering direction 728, 828, 928 and polarization angle 726, 826, 926 of a linear polarized beam 722 to follow a moving RF station 712. As noted, the phased array antenna system 702 can alternatively be part of the mobile RF station 712 and thus repeatedly change the steering direction and polarization angle of the linear polarized beam 722 to maintain orientation with a stationary RF station 700 while the mobile RF station 712 (and thus the phased array antenna system 702) moves along a motion path 802. Regardless, the phased-array antenna system 702 can do so in accordance with the process 600 of FIG. 6.

Although not shown, in the example illustrated in FIGS. 7A-9B, one or more additional characteristics of the beam 722 can also be changed. For example, while setting the steering direction A 728 and polarization angle A 726, a characteristic of the side lobe of the beam 722 can also be set by setting the values of the amplitude parameters A1(i), A2(i) in the amplitude controllers 122, 132 (or 522, 532) to combined values that correspond to both the desired polarization angle A 726 and the desired side lobe taper A. For example, the amplitude parameters A1(i), A2(i) in the amplitude controllers 522, 532 in each of the N signal modifiers 508, 548, 558 can be set to a combination of the value $A1_{PA}(i)$ corresponding to the polarization angle A 726 and a value $A2_{SLA}(i)$ corresponding to a desired side lobe taper A of the beam 722 while the RF station 712 is at location A 714. This can be expressed as follows: $A1_{\Sigma A}(i)=\Sigma(A1_{PA}(i), A1_{SLA}(i))$; and $A2_{\Sigma A}(i)=\Sigma(A2_{PA}(i), A2_{SLA}(i))$. The amplitude parameters A1(i), A2(i) in the amplitude controllers 522, 532 in each of the N signal modifiers 508, 548, 558 can then be set to a combination of the value $A1_{PB}(i)$ corresponding to the polarization angle B 826 and a value $A2_{SLB}(i)$ corresponding to a desired side lobe taper B of the beam 722 while the RF station 712 is at location B 814, which can be expressed as follows: $A1_{\Sigma B}(i)=\Sigma(A1_{PB}(i), A1_{SLB}(i))$; and $A2_{\Sigma B}(i)=\Sigma(A2_{PB}(i), A2_{SLB}(i))$. The amplitude parameters A1(i), A2(i) in the amplitude controllers 522, 532 in each of the N signal modifiers 508, 548, 558 can then be set to a combination of the value $A1_{PC}(i)$ corresponding to the polarization angle C 926 and a value $A2_{SLC}(i)$ corresponding to a desired side lobe taper C of the beam 722 while the RF station 712 is at location C 914, which can be expressed as follows: $A1_{\Sigma C}(i)=\Sigma(A1_{PC}(i), A1_{SLC}(i))$; and $A2_{\Sigma C}(i)=\Sigma(A2_{PC}(i), A2_{SLC}(i))$. The beam forming controller 170 (see FIG. 1) can thus control more than two characteristics (e.g., steering direction, polarization, and side lobe taper) of the beam 722 as the RF station 712 undergoes a motion 802.

Although specific embodiments and applications of the invention have been described in this specification, these embodiments and applications are exemplary only, and many variations are possible.

We claim:

1. An antenna system comprising:
   a plurality of dual-orthogonally polarized antenna elements, each antenna element comprising a first signal component input for providing a first signal component of a transmit signal to a first antenna component and a second signal component input for providing a second signal component of the transmit signal to a second antenna component, the first antenna component having a polarization that is orthogonal to a polarization of the second antenna component;

for each of the plurality of antenna elements, a signal modifier that is connected to the corresponding antenna element, each signal modifier comprising:
a signal input for receiving the transmit signal and splitting the transmit signal into the first signal component and the second signal component;
a first processing path between the signal input and the first signal component input of the corresponding antenna element, the first processing path comprising a first amplitude controller for controlling the amplitude of the first signal component in accordance with a first amplitude parameter and a first phase shifter for controlling the phase of the first signal component in accordance with a first phase-shift parameter, and a second processing path between the signal input and the second signal component input of the corresponding antenna element, the second processing path comprising a second amplitude controller for controlling the amplitude of the second signal component in accordance with a second amplitude parameter and a second phase shifter for controlling the phase of the second signal component in accordance with a second phase-shift parameter; and
a controller that is configured to receive input that specifies a desired value for each of a plurality of characteristics for a transmit beam, the controller including a memory structure for each of the plurality of characteristics, each memory structure including a lookup table for each of the signal modifiers, each lookup table defining a plurality of sets of values for the first amplitude parameter, the first phase-shift parameter, the second amplitude parameter and the second phase-shift parameter, each set of values being specific to one of the desired values of the corresponding characteristic, wherein, in response to receiving input that specifies a particular desired value for each of the plurality of characteristics, the controller is configured to access each memory structure to obtain from each lookup table the set of values that corresponds to the particular desired value for each of the plurality of characteristics and then provide each set of values to the corresponding signal modifier such that, when the first and second signal components of the transmit signal are emitted from the first and second antenna elements of each antenna element, the first and second signal components will combine to form the transmit beam that exhibits the desired value for each of the characteristics.

2. The antenna system of claim 1, wherein: a first characteristic is a steering direction of the transmit beam, and a second characteristic is a polarization of the transmit beam.

3. The antenna system of claim 2, wherein: the transmit beam is a linear polarized beam transmitted between a first radio frequency (RF) station and a second RF station, the second characteristic is a polarization angle of the linear polarized beam, the controller is further configured to repeatedly change the value of the first and second phase shift parameters provided to at least some of the signal modifiers so that the steering direction and the polarization angle of the transmit beam tracks relative movement between the first RF station and the second RF station along a motion path.

4. The antenna system of claim 2, wherein the plurality of characteristics comprises three characteristics.

5. The antenna system of claim 4, wherein the third characteristic is a side-lobe taper of the beam.

6. The antenna system of claim 1, wherein providing each set of values to the corresponding signal modifier comprises providing a combined value for each of the first amplitude parameter, the first phase-shift parameter, the second amplitude parameter and the second phase-shift parameter to the corresponding signal modifier.

7. The antenna system of claim 1, wherein each of the antenna elements is a linearly polarized antenna element.

8. The antenna system of claim 1, wherein each of the antenna elements is a circularly polarized antenna element.

9. A process of operating the antenna system of claim 1, the process comprising:
receiving, at the controller, a particular desired value for each of the plurality of characteristics for the transmit beam;
accessing each memory structure to obtain from each lookup table the set of values that corresponds to the particular desired value for each of the plurality of characteristics; and
providing each set of values to the corresponding signal modifier.

10. The process of claim 9, wherein a first characteristic of the plurality of characteristics is a steering direction of the transmit beam and a second characteristic of the plurality of characteristics is a polarization of the transmit beam.

11. The process of claim 10, wherein: the transmit beam is a linear polarized beam, and the process further comprises:
transmitting the linear polarized beam between a first radio frequency (RF) station and a second RF station, and
repeatedly changing the set of values provided to the signal modifiers so that the steering direction and the polarization angle of the transmit beam tracks relative movement between the first RF station and the second RF station along a motion path.

12. The process of claim 10, wherein a third characteristic of the plurality of characteristics is a side-lobe taper of the transmit beam.

13. The process of claim 9 further comprising: receiving the transmit signal comprising an analog carrier in a radio frequency range;
processing the transmit signal in the first processing path of each of the signal modifiers to produce each first signal component;
processing the transmit signal in the second processing path of each of the signal modifiers to produce each second signal component;
providing each first signal component and each second component to the corresponding antenna element; and
each antenna element radiating the corresponding first signal component and the corresponding second signal component to thereby form the transmit beam.

14. The process of claim 9 further comprising:
receiving, at the controller, a new particular desired value for each of the plurality of characteristics for the transmit beam;
accessing each memory structure to obtain from each lookup table the set of values that corresponds to the new particular desired value for each of the plurality of characteristics; and
providing each set of values that corresponds to the new particular desired value for each of the plurality of characteristics to the corresponding signal modifier.

15. An antenna system comprising:
at least three dual-orthogonally polarized antenna elements, each antenna element comprising a first signal component input for providing a first signal component of a transmit signal to a first antenna component and a second signal component input for providing a second signal component of the transmit signal to a second antenna component, the first antenna component having a polarization that is orthogonal to a polarization of the second antenna component;

for each of the plurality of antenna elements, a signal modifier that is connected to the corresponding antenna element, each signal modifier comprising:

a signal input for receiving the transmit signal and splitting the transmit signal into the first signal component and the second signal component; a first processing path between the signal input and the first signal component input of the corresponding antenna element, the first processing path comprising a first amplitude controller for controlling the amplitude of the first signal component in accordance with a first amplitude parameter and a first phase shifter for controlling the phase of the first signal component in accordance with a first phase-shift parameter, and a second processing path between the signal input and the second signal component input of the corresponding antenna element, the second processing path comprising a second amplitude controller for controlling the amplitude of the second signal component in accordance with a second amplitude parameter and a second phase shifter for controlling the phase of the second signal component in accordance with a second phase-shift parameter; and a controller that is configured to receive input that specifies a desired value for each of a plurality of characteristics for a transmit beam, the controller including a memory structure for each of the plurality of characteristics, each memory structure including a lookup table for each of the signal modifiers, each lookup table defining a plurality of sets of values for the first amplitude parameter, the first phase-shift parameter, the second amplitude parameter and the second phase-shift parameter, each set of values being specific to one of the desired values of the corresponding characteristic, wherein, in response to receiving input that specifies a particular desired value for each of the plurality of characteristics, the controller is configured to access each memory structure to obtain from each lookup table the set of values that corresponds to the particular desired value for each of the plurality of characteristics and then provide each set of values to the corresponding signal modifier such that, when the first and second signal components of the transmit signal are emitted from the first and second antenna elements of each antenna element, the first and second signal components will combine to form the transmit beam that exhibits the desired value for each of the characteristics.

* * * * *